United States Patent [19]

Keogh

[11] 4,353,997
[45] * Oct. 12, 1982

[54] COMPOSITIONS BASED ON WATER-CURABLE, SILANE MODIFIED COPOLYMERS OF ALKYLENE-ALKYL ACRYLATES

[75] Inventor: Michael J. Keogh, Bridgewater, N.J.

[73] Assignee: Union Carbide Corporation, Danbury, Conn.

[*] Notice: The portion of the term of this patent subsequent to Sep. 22, 1998, has been disclaimed.

[21] Appl. No.: 250,444

[22] Filed: Apr. 2, 1981

Related U.S. Application Data

[63] Continuation-in-part of Ser. No. 192,319, Sep. 30, 1980, and a continuation-in-part of Ser. No. 70,785, Aug. 29, 1979, Pat. No. 4,291,136, which is a continuation-in-part of Ser. No. 892,153, Mar. 31, 1978, abandoned.

[51] Int. Cl.$^3$ .............. C08K 3/10; C08K 5/04; C08K 5/16; C08K 3/30

[52] U.S. Cl. .............. 523/210; 523/200; 524/81; 524/87; 524/288; 524/371; 524/394; 524/409; 524/411; 524/412; 524/423; 524/424; 524/425; 524/430; 524/433; 524/436; 524/451; 524/562

[58] Field of Search .......... 525/102, 106, 288; 260/42.26; 523/200, 210; 524/81, 87, 288, 371, 394, 409, 411, 412, 423, 562

[56] References Cited

U.S. PATENT DOCUMENTS

| | | | |
|---|---|---|---|
| 3,427,187 | 2/1969 | Wiggill | 525/106 |
| 3,441,545 | 8/1969 | Blatz et al. | 525/329 |
| 3,830,872 | 8/1974 | Schrage et al. | 525/288 |
| 4,243,579 | 1/1981 | Keogh | 260/45.7 R |
| 4,255,303 | 3/1981 | Keogh | 260/23 H |

Primary Examiner—Wilbert J. Briggs, Sr.
Attorney, Agent, or Firm—James C. Arvantes

[57] ABSTRACT

The disclosure of this application is directed to a water-curable composition comprising a water-curable, silane modified alkylene-alkyl acrylate copolymer, a mineral filler and a halogenated flame retardant additive. These compositions are useful as extrudates about wires and cables providing insulation or jacketing thereon characterized by resistance to deformation and by flame retardancy.

29 Claims, No Drawings

COMPOSITIONS BASED ON WATER-CURABLE, SILANE MODIFIED COPOLYMERS OF ALKYLENE-ALKYL ACRYLATES

This application is a continuation-in-part of copending application Ser. No. 192,319 filed Sept. 30, 1980 and a continuation-in-part of copending application Ser. No. 070,785 filed Aug. 29, 1979, now U.S. Pat. No. 4,291,136 which in turn is a continuation-in-part of application Ser. No. 892,153 filed Mar. 31, 1978, now abandoned.

SUMMARY OF THE INVENTION

This application relates to compositions based on a water-curable, silane modified alkylene-alkyl acrylate copolymer, mineral fillers and a halogenated flame retardant additive. The compositions of this invention are particularly useful in extrusion applications, being extruded about electrical wires and cables, and telephone wires and cables and water-cured to crosslinked products which provide protective coatings, as insulation or jacketing, characterized by resistance to deformation and by improved flame retardant properties.

BACKGROUND OF THE INVENTION

Currently, protective coatings, such as insulation and jacketing, are being applied about wires and cables by extruding thereon compositions containing an organic peroxide and subjecting the resultant articles to elevated temperatures in order to cure the compositions to crosslinked products. The overall operation, commonly referred to as peroxide curing, requires careful control of the process parameters to avoid undue heat and pressure build-up in the extruder. Undue heat and pressure build-up results in premature decomposition of the peroxide which in turn results in crosslinking of the compositions in the extruder. Crosslinking of the compositions in the extruder, commonly referred to as "scorch" necessitates, in extreme cases, stopping the operation and cleaning the extruder. In situations wherein "scorch" occurs but is not as severe, it has been found that the work-life of the ultimate coatings is relatively short. In addition to the processing difficulties of peroxide curing, the peroxide containing compositions do not have that degree of resistivity to deformation, at normal peroxide loadings, demanded by many ultimate users of insulated and jacketed wire and cable articles.

DESCRIPTION OF THE INVENTION

The present invention provides compositions, based on water-curable, silane modified copolymers, which are characterized by improved flame retardancy and increased resistance to deformation. The compositions of this invention are particularly useful as insulation about electrical wires and cables and as jacketing about telephone wires and cables.

Furthermore, the compositions of this invention allow for wide latitude in the processing thereof in that the compositions can be extruded at temperatures far in excess of the maximum processing temperatures used in extruding peroxide containing compositions. Being capable of extrusion at higher temperatures, the compositions of the present invention can be extruded at faster rates and under lower pressures yielding protective coatings of improved surface characteristics, having improved dispersion of additives therein. This advantage is particularly important in heavily filled compositions such as those utilized in flame retardant applications.

In its broadest aspect, the present invention provides compositions comprising a water-curable, silane modified alkylene-alkyl acrylate copolymer, a mineral filler and a halogenated flame retardant additive wherein the mineral filler is present in an amount of about one to about 100 percent by weight, preferably about 20 to about 60 percent by weight; and wherein the halogenated flame retardant additive is present in an amount of about one to about 100 percent by weight and preferably about 10 to about 60 percent by weight.

Unless otherwise stated, percent by weight is based on the weight of the water-curable, silane modified alkylenealkyl acetate copolymer.

A preferred composition, for purposes of the present invention, comprises a water-curable, silane modified alkylene-alkyl acrylate copolymer, talc, as the mineral filler, and a halogenated flame retardant additive wherein the amounts are as previously defined.

Another preferred composition comprises a water-curable, silane modified alkylene-alkyl acrylate copolymer, a halogenated flame retardant additive and, as the mineral filler, an oxide, hydroxide, carbonate or sulfate of calcium or magnesium wherein the amounts are as previously defined.

Suitable water-curable, silane modified alkylene-alkyl acrylate copolymers can be produced as described in my copending application Ser. No. 070,785 filed Aug. 29, 1979 now U.S. Pat. No. 4,291,136, the disclosure of which is incorporated herein by reference, by reacting an alkylene-alkyl acrylate copolymer with an organo silane in the presence of an organo titanate.

The water-curable, silane modified copolymers produced contain units of Formulas I-III described below.

Formula I—alpha olefin units having the formula:

wherein

A is hydrogen or an alkyl radical having one to 16 carbon atoms, these alpha olefin units being present in the copolymers to the extent of at least 50 percent by weight;

at least 0.1 percent by weight of polymerized units containing the radical having the formula:

Formula II:

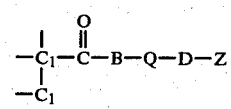

wherein: B is an oxygen atom, a sulfur atom or

$C_1$ is a carbon atom in the main polymer chain, R is hydrogen or a monovalent hydrocarbon radical having one to 18 carbon atoms; Q is a divalent radical, such as a divalent hydrocarbon radical having 1 to 18 carbon atoms and is bonded to —B— and —D— through carbon atoms; D is a silicon containing radical of the formula:

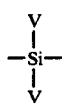

wherein V is hydrogen, a monovalent hydrocarbon radical of one to 18 carbon atoms or a hydrolyzable group; and Z is a hydrolyzable group; and polymerized units having the formula:

Formula III:

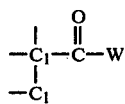

wherein, as stated, $C_1$ is a carbon atom in the main polymer chain and W is an alkoxy radical having one to 18 carbon atoms.

A preferred copolymer is one wherein B is —O—, Q is —$CH_2$—$CH_2$— or —$CH_2$—$CH_2$—$CH_2$— and Z and V are methoxy, ethoxy or butoxy and A is alkyl, exemplified by alkyl radicals for R below, or hydrogen.

Illustrative of suitable hydrocarbon radicals for R are alkyl radicals having one to 18 carbon atoms, preferably one to 4 carbon atoms such as methyl, ethyl, n-propyl, isopropyl, n-butyl and the like; aryl radicals having 6 to 8 carbon atoms such as phenyl, benzyl, xylyl and the like.

Exemplary of suitable hydrocarbon radicals for Q are alkylene radicals having one to 18 carbon atoms, preferably one to 6 carbon atoms such as methylene, ethylene, propylene, butylene, hexylene and the like; alkoxy radicals having one to 18 carbon atoms, preferably one to 6 carbon atoms such as methoxymethyl, methyloxypropyl, ethyloxyethyl, ethyloxypropyl, propyloxypropyl, propyloxybutyl, propyloxyhexyl and the like; arylene radicals such as phenylene and the like as well as radicals of the formula:

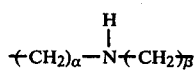

wherein $\alpha$ and $\beta$ are integers of one to 3.

As stated, each V can be hydrogen, a hydrocarbon radical or a hydrolyzable group. Illustrative of suitable hydrocarbon radicals are alkyl radicals having one to 18 carbon atoms, preferably one to 6 carbon atoms, such as methyl, ethyl, n-propyl, isopropyl, n-butyl, n-hexyl, dodecyl, and the like; alkoxy radicals having one to 18 carbon atoms, preferably one to 6 carbon atoms, such as methoxy, ethoxy, propoxy, hexoxy, dodecyloxy, methoxyethoxy and the like; aryl radicals having 6 to 8 carbon atoms such as phenyl, methyl phenyl, ethyl phenyl and the like; cycloaliphatic radicals having 5 to 8 carbon atoms such as cyclopentyl, cyclohexyl, cyclohexyloxy and the like.

Z, as previously stated, is a hydrolyzable group among which can be noted alkoxy radicals as previously described for V; oxy aryl radicals such as oxyphenyl and the like; oxyaliphatic radicals such as oxyhexyl and the like; halogens such as chlorine and the like and other hydrolyzable groups as further described in U.S. Pat. No. 3,408,420 to John B. Wiggill, patented Oct. 29, 1968.

Also, W, as stated is an alkoxy radical having one to 18 carbon atoms, as defined for V.

The alkylene-alkyl acrylate copolymers with which the organo silanes are reacted to form the silane modified copolymers are known copolymers produced by reacting an alkene with an alkyl acrylate.

Suitable alkenes are ethylene, propylene, butene-1, isobutylene, pentene-1, 2-methylbutene-1, 3-methylbutene-1, hexene, heptene-1, octene-1, vinyl chloride, styrene and the like and mixtures thereof.

The alkylene moiety of the alkylene-alkyl acrylate copolymer generally contains from 2 to 18 carbon atoms inclusive, preferably 2 to 3 carbon atoms inclusive.

Suitable alkyl acrylate monomers which are copolymerized with the alkenes fall within the scope of the following formula:

Formula IV:

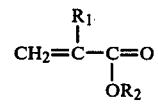

wherein $R_1$ is hydrogen or methyl and $R_2$ is alkyl having one to 8 carbon atoms. Illustrative compounds encompassed by this formula are: methyl acrylate, ethyl acrylate, t-butyl acrylate, methyl methacrylate, n-butyl acrylate, n-butyl methacrylate, 2-ethylhexyl acrylate and the like and mixtures thereof.

Alkylene-alkyl acrylate copolymers generally have a density (ASTMD-1505 with a conditioning as in ASTMD-147-72) of about 0.92 to about 0.94 and a melt index (ASTMD-1238 of 44 psi tested pressure) of about 0.5 to about 500 decigrams per minute.

For purposes of the present invention, the preferred copolymer generally has about one to about 50 percent by weight combined alkyl acrylate, preferably about 2 to about 20 percent by weight combined alkyl acrylate.

Suitable monomeric organo silanes reacted with the alkylene-alkyl acrylate copolymers to form the watercurable, silane modified polymers fall within the scope of Formula V below.

Formula V:

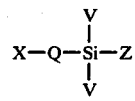

wherein X is —SH,

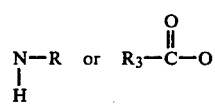

and $R_3$ is

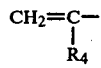

or a monovalent hydrocarbon radical as defined for R, $R_4$ is a monovalent hydrocarbon radical as defined for R and V, Q and Z are as previously defined.

Preferred silanes fall within the scope of the Formula VI below.

Formula VI:

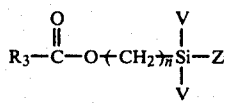

wherein $R_3$, V and Z are as previously defined and n is an integer of one to 18.

Exemplary of suitable silanes falling within the scope of Formula VI are the following:

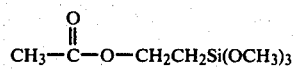

acetooxyethyltrimethoxysilane

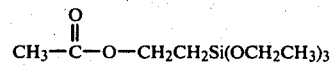

acetooxyethyltriethoxysilane

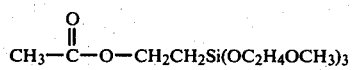

acetooxyethyl-tris-(2-methoxyethoxy)silane

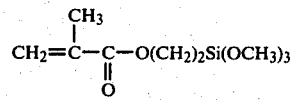

β-methacryloxyethyltrimethoxysilane

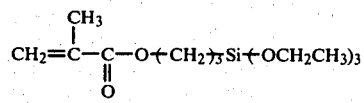

α-methacryloxypropyltriethoxysilane

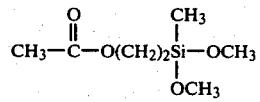

acetooxyethylmethyldimethoxysilane

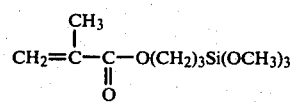

α-methacryloxypropyltrimethoxysilane

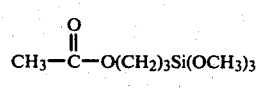

acetooxypropyltrimethoxysilane

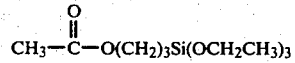

acetooxypropyltriethoxysilane

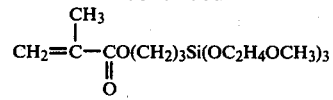

α-methacryloxypropyl-tris-(2-methoxyethoxy)silane

Other suitable silanes have the formulae:
$NH_2(CH_2)_3Si(OCH_3)_3$
α-aminopropyltrimethoxysilane
$NH_2(CH_2)_3Si(OC_2H_5)_3$
α-aminopropyltriethoxysilane
$NH_2(CH_2)_2Si(OCH_3)_3$
β-aminoethyltrimethoxysilane
$NH_2(CH_2)_2Si(OC_2H_5)_3$
β-aminoethyltriethoxysilane Suitable organo titanate compounds for catalyzing the reaction between an organo silane and an alkylene-alkyl acrylate copolymer can be characterized by the following formula:

Formula VII:

$$Ti(OR^2)_4$$

wherein each $R^2$, which can be the same or different, is hydrogen or a monovalent hydrocarbon radical having one to 18 carbon atoms, preferably one to 14 carbon atoms.

Exemplary of suitable hydrocarbon radicals are alkyl radicals such as methyl, ethyl, n-propyl, isopropyl, butyl, octyl, lauryl, myristyl, stearyl and the like; cycloaliphatic radicals such as cyclopentyl, cyclohexyl and the like; aryl radicals such as phenyl, methylphenyl, chlorophenyl and the like; alkaryl radicals such as benzyl and the like.

Particularly desirable titanates falling within the scope of Formula VII are those wherein each $R^2$ is alkyl having one to 18 carbon atoms, preferably one to 14 carbon atoms, exemplified by tetrabutyl titanate, tetraisopropyl titanate and the like.

Organo titanates falling within the scope of Formula VII are known compounds and can be conveniently prepared as described in U.S. Pat. No. 2,984,641 to Leon E. Wolinski patented May 16, 1961.

Other suitable organo titanates are the organo titanium chelates such as tetraoctylene glycol titanium, triethanol amine titanate, titanium acetyl acetonate, titanium lactate and the like.

The amount of silane used can vary from about 0.1 to about 10 and preferably about 0.3 to about 5 percent by weight based on the weight of the copolymer.

The amount of organo titanate catalyst added to the reaction mixture is a catalytic amount, sufficient to catalyze the reaction between the silane and the copolymer. A preferred amount is from about 0.10 to about 2.0 percent by weight, based on the weight of the copolymer.

The temperature at which this reaction is carried out is not critical and can vary, conveniently, from about 80° C. to about 300° C. and preferably from about 150° C. to about 230° C.

The reaction can be carried out at atmospheric, subatmospheric or superatmospheric pressure, although atmospheric pressure is preferred.

Other suitable water-curable silane modified alkylene-alkyl acrylate copolymers are produced, as described in my copending application Ser. No. 192,319, the disclosure of which is incorporated herein by reference, by reacting a mixture containing an organo titanate, as previously described, an alkylene-alkyl acrylate copolymer and a polysiloxane containing repeating units of the formula:

Formula VIII:

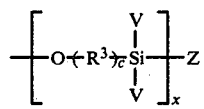

wherein $R^3$ is a divalent hydrocarbon radical; each V, and Z are as previously defined; c is an integer having a value of one to 18 and x is an integer having a value of at least 2, generally 2 to 1000, preferably 5 to 25.

Illustrative of suitable hydrocarbon radicals for $R^3$ are alkylene radicals having one to 18 carbon atoms, preferably one to 6 carbon atoms, such as methylene, ethylene, propylene, butylene, hexylene and the like; alkoxy radicals having one to 18 carbon atoms, preferably one to 6 carbon atoms such as methyloxymethyl, methyloxypropyl, ethyloxyethyl, ethyloxylpropyl, propyloxypropyl, propyloxybutyl, propyloxyhexyl and the like.

Polysiloxanes having repeating units falling within the scope of Formula VIII can be prepared by condensing and polymerizing a silane falling within the scope of Formula V in the presence of a metal carboxylate. Among suitable metal carboxylates can be noted dibutyltin dilaurate, stannous acetate, stannous octoate, lead naphthenate, zinc octoate, iron 2-ethyl hexoate and the like. Conditions employed for the production of polysiloxanes, reaction temperatures, amount of materials and the like, using metal carboxylates as catalysts, are the same as subsequently described with respect to the use of organo titanates.

Preferred polysiloxanes, for purposes of this invention, contain repeating units falling within the scope of Formula VIII and have combined therein an organo titanate. The organo titanate modified polysiloxanes can be used as such, to react with the copolymers of alkylene-alkyl acrylate, as explained subsequently.

The preferred polysiloxanes have a viscosity of about 0.5 poise to about 150 poise, preferably about one to about 20 poise as determined by a Gardner-Holt bubble viscometer at a temperature of 25° C.

At least a catalytic amount of organo titanate is used to produce the organo titanate modified polysiloxanes, that is an amount sufficient to catalyze the condensation and polymerization reaction to produce a polysiloxane. As a rule, the amount of organo titanate used is on the order of about 0.001 to about 25 percent by weight based on the weight of the monomeric silane. It is preferred to use about 0.5 to about 5 percent by weight of organo titanate based on the weight of the monomeric silane.

The temperature at which the reaction is conducted can be varied over a wide range, for example from about 0° C. to about 250° C. A temperature in the range of about 70° C. to about 130° C. is preferred. Also the reaction can be conducted using a suitable solvent, illustrated by hydrocarbon solvents such as toluene, xylene, cumene, decalin, dodecane, chlorobenzene and the like.

The reaction between the organo titanate and the monomeric silane can be conducted under atmospheric, subatmospheric or superatmospheric pressure. It is preferred to conduct the later stages of the reaction under subatmospheric pressure to allow for more facile removal of volatile by-products. Also, the reaction is preferably conducted under the atmosphere of an inert gas such as nitrogen or argon to avoid formation of a gel due to the water sensitivity of the product.

Completion of the reaction is evidenced by cessation of the evolution of volatiles and the weight/volume of volatiles collected as compared to the theoretical weight/volume. Alternatively, the reaction can be run to a desired viscosity level and the reactants cooled to stop the reaction.

The production of a silane modified copolymer of an alkylene-alkyl acrylate is carried out by reacting a polysiloxane, as described with a copolymer of an alkylene-alkyl acrylate in the presence of an organo titanate catalyst.

In those instances wherein the polysiloxane contains combined organo titanate, additional organo titanate catalyst may not be necessary, especially when at least about 0.5 percent by weight organo titanate, based on the weight of the monomeric silane, was used in the preparation of the polysiloxane.

The amount of organo titanate catalyst added to the reaction mixture is a catalytic amount, sufficient to catalyze the reaction between the polysiloxane and the copolymer. A preferred amount is from about 0.001 to about 50 percent by weight, most preferably about 0.1 to about 25 percent by weight based on the weight of the polysiloxane.

The amount of polysiloxane used can vary from about 0.05 to about 10 and preferably about 0.3 to about 5 percent by weight based on the weight of the copolymer.

The temperature at which this reaction is carried out is not critical and can vary, conveniently, from about 80° C. to about 300° C. and preferably from about 150° C. to about 230° C.

The reaction can be carried out at atmospheric, subatmospheric or superatmospheric pressure, although atmospheric pressure is preferred and in the presence of solvents as previously described.

Completion of the reaction is evidenced by measurement of no further viscosity change.

Recovery of the silane modified copolymer is effected by allowing the contents of the reaction flask to cool and discharging to a suitable receiver for storage preferably under an inert gas blanket.

The reaction can be carried out in any suitable apparatus, preferably an apparatus in which the copolymer is subjected to mechanical working such as a Brabender mixer, a Banbury mixer or an extruder. The polysiloxane can be added to the fluxed copolymer and the organo titanate, if needed, then added. Alternatively, the organo titanate, if needed, can be added to the copolymer prior to the addition of the polysiloxane. Also, organo titanate and polysiloxane can be premixed and added to the fluxed polymer.

Other suitable water-curable silane modified alkylene-alkyl acrylate copolymers can be produced by grafting an unsaturated silane such as vinyl trimethoxysilane, vinyl triethoxy silane, β-methacryloxyethyltrimethoxysilane, γ-methacryloxypropyltrimethoxysilane onto an alkylene-alkyl acrylate copolymer as described in U.S. Pat. No. 3,646,155 patented Feb. 29, 1972, the disclosure of which is incorporated herein by reference.

As previously stated the compositions of this invention comprise a water-curable, silane modified alkylenealkyl acrylate copolymer, a mineral filler and a halogenated flame retardant additive.

Illustrative of suitable mineral fillers are the following: talc, aluminum trihydrate, antimony oxide, barium sulfate, calcium silicate, molybdenum oxide, silica, red phosphorus, zinc borate, clay, calcium or magnesium salts or bases as previously described and the like. As indicated, the preferred mineral fillers are talc, calcium or magnesium compounds per se or coated with a metal salt of a fatty acid having 8 to 20 carbon atoms wherein the metal is of Groups Ia, IIa and IIb of the Mendeleev Periodic Table of Elements. Acids used to form the metal salts are saturated or unsaturated monobasic or dibasic, branched or straight chain fatty acids of 8 to 20 carbon atoms. Exemplary of such acids are palmitic, stearic, lauric, oleic, sebacic, ricinoleic, palmitoleic and the like with stearic acid being preferred. The preferred metal salts are calcium stearate and zinc stearate.

The preferred mineral fillers can also be coated with a compatible hydrophobic material such as an organo silane, or organo titanate or a metal salt of a fatty acid, previously described.

Mineral fillers can be conveniently coated using about 0.05 to about 5 parts by weight of hydrophobic material per 100 parts by weight of mineral filler, in a manner as described in U.S. Pat. No. 4,255,303 granted Mar. 10, 1981.

Halogenated flame retardant additives which are used in the formulation of compositions of this invention are well known to those skilled in the art. These flame retardant additives are halogenated (brominated, chlorinated or fluorinated) organic compounds. The preferred halogenated organic compounds include chlorinated polyethylene, polyvinyl chloride, polyvinylidene chloride, polyvinyl chloride copolymers, halogenated paraffin and paraffin waxes, chlorinated alicyclic hydrocarbons, and brominated aromatic compounds. The most preferred include decabromodiphenyl oxide and compounds of the following formulae:

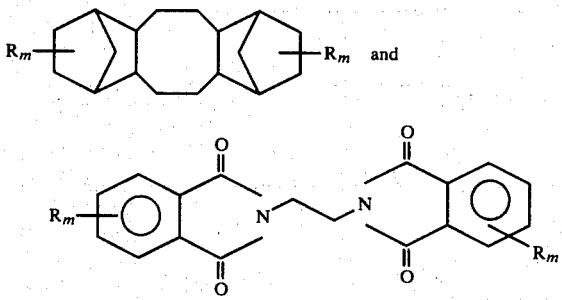

wherein R is independently chlorine or bromine and m is an integer from one to 6, such as ethylene bis(tetrabromophthalimide).

In addition to the water-curable, silane modified alkylene-alkyl acrylate copolymer, mineral filler and flame retardant additive, the compositions of this invention can contain additives such as carbon black, lubricants, UV stabilizers, dyes colorants, antioxidants, smoke inhibitors and the like.

It is to be understood that mixtures of mineral fillers, flame retardant additives, silane modified alkylene-alkyl acrylate copolymers and additives can be used if so desired.

The compositions of the present invention are conveniently formulated by blending in a suitable apparatus such as a Brabender mixer and the like as described in the Examples which follow.

Curing of the compositions to crosslinked products is carried out by exposing the compositions to moisture. The moisture present in the atmosphere is usually sufficient to permit curing to occur over a period of 48 hours.

The rate of curing, in a matter of 30 minutes, can be accelerated by exposure to an artificially humidified atmosphere or immersion in water, and heating to elevated temperatures or by exposure to steam. Generally, curing is effected at temperatures on the order of about 23° C. to about 100° C., preferably about 70° C. to about 100° C.

Additionally, curing may be accelerated by the use of a silanol condensation catalyst such as dibutyltin dilaurate or an organo titanate.

Compositions of the present invention, Examples 1–7, the formulations of which are described in Table 1, were prepared as follows:

All ingredients with the exception of the organo titanate, the monomeric silane, the polysiloxane and the dibutyltin dilaurate were mixed to homogeniety in a Brabender mixer which had been preheated to a temperature of 160° C. After homogeniety was attained, the organo titanate, the dibutyltin dilaurate and the monomeric silane or polysiloxane were introduced into the Brabender mixer. The mixture was reacted for 30 minutes at a temperature of 160° C.–170° C. and the resultant composition containing the water-curable, silane modified alkylene-alkyl acrylate copolymer was discharged hot into a polyethylene bag and kept under a blanket of argon.

Samples of each composition were used to prepare test plaques, having dimensions of 3 inches by 8 inches by 0.125 inch in a press, under the following conditions:

| Pressure | 5000 psi |
| Temperature | 130° C. |
| Time Cycle | 5 minutes |

Controls 1–4, peroxide based compositions, the formulations of which are described in Table 1, were prepared by admixing the components in a 40 gram Brabender mixer, which had been preheated to a temperature of 120° C., for about 5 minutes. After the 5 minute period, the contents of the Brabender were discharged hot, flattened in a press and allowed to cool.

Samples of each composition were used to prepare test plaques, having dimensions of 3 inches by 8 inches by 0.125 inch, in a press under the following conditions:

| Pressure | 5000 psi |
| Temperature | 180° C. |
| Time Cycle | 15 minutes |

Plaques of compositions 1–7 and controls 1–4 were then subjected to the following tests:

| Limiting Oxygen Index | ASTMD-2863-70 |
| Monsanto Rheometer Cure | Described in Detail U.S. Pat. No. 4,018,852 granted April 19, 1977 |
| Decalin Extractables | ASTMD-2765 |

| Deformation | ASTMD-621 |
|---|---|

As to these tests, a higher Rheometer value indicates that the product has cured to a higher crosslinked density; a higher value for Limiting Oxygen Index indicates better flame retardant properties, a lower value for Decalin Extractables indicates a higher degree of crosslinking; a lower value for Deformation indicates improved resistivity to deformation. The values reported are averages obtained on testing two plaques in each instance.

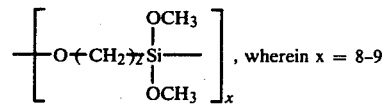

EXAMPLE 8

A composition was extruded onto a #14 AWG solid copper wire by feeding a composition, described in Example 6, with the exception of the polysiloxane, the tetraisopropyl titanate and the dibutyltin dilaurate, into a 2½, 24 to 1 (length to diameter) Royle Extruder, combining in the extruder, the initial feed with a second feed of a mixture of the polysiloxane, the tetraisopropyl titanate and the dibutyltin dilaurate. The amount of the second feed was 1.4 percent by weight based on the weight of the first feed. The weight ratio of polysiloxane to tetraisopropyl titanate to dibutyltin dilaurate was 24 to 4 to 1. The resultant reacted composition was extruded onto the wire under the following conditions:

|  | Example 1 | Control 1 | Example 2 | Control 2 | Example 3 | Control 3 | Example 4 | Control 4 | Example 5 | Example 6 | Example 7 |
|---|---|---|---|---|---|---|---|---|---|---|---|
| Ethylene-ethyl acrylate copolymer Melt Index 1.3 Percent by Weight ethyl acrylate - 15 | 100 | 100 | 100 |  |  |  |  |  | 100 | 100 | 100 |
| Ethylene-ethyl acrylate-t-butyl acrylate copolymer/Melt Index 3 Percent by Weight butyl acrylate-13 Percent by Weight ethyl acrylate-9 |  |  |  |  |  |  | 100 |  |  |  |  |
| Zinc coated with one percent zinc stearate | 54.5 |  | 44.4 |  | 36.6 |  | 36.8 |  | 43.1 | 41.6 | 36.6 |
| Calcium carbonate coated with one percent calcium stearate |  |  |  |  | 4.5 |  | 4.5 |  | 16.7 |  |  |
| Antimony oxide containing 3 percent by weight white mineral oil |  |  |  |  | 4.6 |  | 4.6 |  |  | 4.4 |  |
| Red phosphorus |  |  |  |  |  |  |  |  |  |  | 4.5 |
| Ethylene bis(tetrabromophthalimide) |  |  |  |  |  |  |  |  | 32.4 | 28.1 | 28.6 |
| Decabromodiphenyloxide |  | 40 |  | 50 |  |  |  |  |  |  |  |
| Aromatic bromine |  |  |  |  | 28.6 |  | 28.6 |  |  |  |  |
| 1,2-dihydro 2,3,4-trimethyl quinoline | 1.0 |  | 1.0 |  | 1.1 |  | 1.1 |  | 1.2 | 1.1 | 1.1 |
| Vinyl tris(2-methoxyethoxy) silane |  |  |  |  | 0.36 |  | 0.36 |  |  | 0.35 | 0.35 |
| Acetooxyethyl trimethoxy silane | 4.0 |  | 4.0 |  |  |  | 3.57 |  |  |  |  |
| Polysiloxane |  |  |  |  | 2.32 |  |  |  | 2.45 | 4.0 | 2.32 |
| Tetraisopropyl titanate | .48 |  | 0.48 |  | 0.43 |  | 0.40 |  | 0.24 | 0.52 | 0.43 |
| Dibutyltin dilaurate | 0.12 |  | 0.12 |  | 0.11 |  | 0.13 |  | 0.06 | 0.13 | 0.11 |
| Di-α-cumyl peroxide |  | 3.2 |  | 3.2 |  | 2.68 |  | 2.68 |  |  |  |

PROPERTIES COMPARED

| TEST | Example 1 | Control 1 | Example 2 | Control 2 | Example 3 | Control 3 | Example 4 | Control 4 | Example 5 | Example 6 | Example 7 |
|---|---|---|---|---|---|---|---|---|---|---|---|
| Monsanto Rheometer, Inch-Pounds | 64 | 65 | 63 | 63 | 47 | 43 | 47 | 42 | 65 | 75 | 35 |
| Decalin Extractables, Percent | 30.9 | 27.9 | 36.4 | 31.2 | 31.4 | 29.1 | 18.3 | 15.7 | 27.6 | 16.2 | 35.7 |
| Deformation at 121° C., Percent | 3.4 | 17.8 | 4.3 | 18.8 | 14.8 | 31.6 | 32.0 | 47.0 | — | 15 | — |
| Limiting Oxygen Index | 27.6 | 25.4 | 28.6 | 27.0 | 28.8 | 28.3 | — | — | 26.9 | — | 25.3 |

The aromatic bromine noted in the examples has the formula:

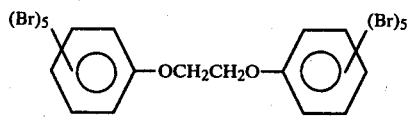

The decabromodiphenyl oxide noted in the examples contained 83 percent by weight combined bromine.

The polysiloxane noted in the examples had a viscosity of 3.4 poise and a repeating unit of:

| Cycle Compound | 1-2 minutes |
|---|---|

| | -continued |
|---|---|
| Temperatures | 190° C.–200° C. |

The coated wire was fed through a water trough, which was at ambient temperatures, with the result that the composition on the wire was cured to a crosslinked product having a thickness of about 30 mils.

Tests were conducted on the coated wire as well as on plaques formed from material stripped from the wire. The stripped material was deformed into plaques, having dimensions of 3 inches by 8 inches by 0.125 inch, in a press under the following conditions:

| | |
|---|---|
| Pressure | 5000 psi |
| Temperature | 150° C. |
| Time Cycle | 15 minutes |
| Monsanto Rheometer cure | 35.5 inch-pounds (average value of 3 plaques) |
| Tensile Elongation | 1700 psi (average value of 3 plaques) |
| Deformation | 25.9 percent (average value of 3 plaques) Union Carbide Corporation Standard Testing Method WC-75-A at 121° C. |
| Deformation on Wire | 18.6 percent Union Carbide Corporation Standard Testing Method WC-75-B at 121° C. |

Composition passed the VW1 flame test indicating good flame resistance. Underwriters Laboratories Testing Method in UL Subject 44 (Revised 1974 Edition).

With respect to extruding the compositions of this invention onto a wire and cable the temperatures used, broadly speaking, range from about 100° to 300° C., preferably 150° to 230° C.

The compositions of this invention have been described principally for use in extrusion operations for application to wire and cable coating. It is to be understood that these compositions are also useful for extruded pipe, foamed articles, blow molded articles, injection molded articles, heat shrinkable articles, as well as, for application with fiberglass, graphite fibers, nylon fibers and the like for extruded sheet.

What is claimed is:

1. A water-curable composition comprising a water-curable, silane modified alkylene-alkyl acrylate copolymer, a mineral filler and a halogenated flame retardant additive wherein the mineral filler is present in an amount of about one to 100 percent by weight based on the weight of said copolymer and said halogenated flame retardant additive is present in an amount of about one to about 100 percent by weight based on the weight of said copolymer.

2. A water-curable composition as defined in claim 1 wherein the mineral filler is present in an amount of about 20 to about 60 percent by weight and wherein the halogenated flame retardant additive is present in an amount of about 10 to about 60 percent by weight.

3. A water-curable composition as defined in claim 1 wherein the mineral filler is talc.

4. A water-curable composition as defined in claim 3 wherein the talc is coated with a compatible hydrophobic material.

5. A water-curable composition as defined in claim 4 wherein the hydrophobic material is a metal salt of a fatty acid.

6. A water-curable composition as defined in claim 5 wherein the metal salt of a fatty acid is calcium stearate or zinc stearate.

7. A water-curable composition as defined in claim 1 wherein the mineral filler is an oxide, hydroxide, carbonate or sulfate of magnesium or calcium.

8. A water-curable composition as defined in claim 7 wherein the said mineral filler is coated with a compatible hydrophobic material.

9. A water-curable composition as defined in claim 8 wherein the hydrophobic material is a metal salt of a fatty acid.

10. A water-curable composition as defined in claim 9 wherein the hydrophobic material is calcium stearate or zinc stearate.

11. A water-curable composition as defined in claim 1 wherein the alkylene-alkyl acrylate copolymer is an ethylene-ethyl acrylate copolymer.

12. A water-curable composition as defined in claim 1 wherein the alkylene-alkyl acrylate copolymer is an ethylene-ethyl acrylate-t-butyl acrylate copolymer.

13. A water-curable composition as defined in claim 1 wherein the silane is derived from acetooxyethyltrimethoxysilane.

14. A water-curable composition as defined in claim 1 wherein the halogenated flame retardant additive is decabromodiphenyloxide.

15. A water-curable composition as defined in claim 1 wherein the halogenated flame retardant additive is ethylene bis-(tetrabromophthalimide).

16. A water-curable composition as defined in claim 1 wherein the halogenated flame retardant additive is an aromatic bromine compound.

17. A water-curable composition comprising a water-curable, silane modified ethylene-ethyl acrylate copolymer, talc, as a mineral filler, and a halogenated flame retardant additive, wherein the amounts are as defined in claim 1.

18. A water-curable composition comprising a water-curable, silane modified ethylene-ethyl acrylate copolymer, an oxide, hydroxide, carbonate or sulfate of magnesium or calcium, as a mineral filler, and a halogenated flame retardant additive wherein the amounts are as defined in claim 1.

19. A water-curable composition as defined in claim 1 containing calcium carbonate as a mineral filler.

20. The crosslinked product of the composition defined in claim 1.

21. A wire or cable having as a coating thereon the composition or the crosslinked product of the composition defined in claim 1.

22. A water-curable composition as defined in claim 1 wherein the mineral filler is a mixture of talc and an oxide, hydroxide, carbonate, sulfate of magnesium or calcium.

23. A water-curable composition as defined in claim 22 wherein the alkylenealkylacrylate copolymer is an ethylene-ethylacrylate copolymer.

24. A molded article produced from the composition of claim 1.

25. A water-curable composition as defined in claim 1 wherein the mineral filler is a mixture of talc and antimony oxide.

26. A water-curable composition as defined in claim 1 wherein the mineral filler is a mixture of antimony oxide and an oxide, hydroxide, carbonate or sulfate of a magnesium or calcium.

27. A water-curable composition as defined in claim 1 wherein the mineral filler is a mixture of talc, antimony trioxide and an oxide, hydroxide, carbonate or sulfate of magnesium or calcium.

28. A water-curable composition comprising a water-curable silane modified alkylene-alkyl acrylate copolymer containing:

alpha olefin units having the formula;

wherein A is hydrogen or an alkyl radical having one to 16 carbon atoms, these alpha olefin units being present in the copolymer to the extent of at least 50 percent by weight;

at least 0.1 percent by weight of polymerized units containing the radical having the formula:

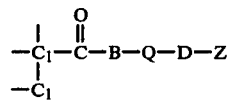

wherein: B is an oxygen atom, a sulfur atom or

$C_1$ is a carbon atom in the main polymer chain, R is hydrogen or a monovalent hydrocarbon radical having one to 18 carbon atoms; Q is a divalent hydrocarbon radical having 1 to 18 carbon atoms and is bonded to —B— and —D— through carbon atoms; D is a silicon containing radical having the formula:

wherein V is hydrogen, a monovalent hydrocarbon radical of one to 18 carbon atoms or a hydrolyzable group; and Z is a hydrolyzable group; and polymerized units having the formula:

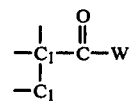

wherein $C_1$ is a carbon atom in the main polymer chain and W is an alkoxy radical having one to 18 carbon atoms, a mineral filler and a halogenated flame retardant additive wherein the mineral filler is present in an amount of about one to 100 percent by weight based on the weight of said copolymer and said halogenated flame retardant additive is present in an amount of about one to about 100 percent by weight based on the weight of said copolymer.

29. A composition as defined in claim 28 containing a water-curable, silane modified copolymer as defined by formula wherein B is oxygen, Q is —CH₂—CH₂— or —CH₂—CH₂—CH₂—, Z and V are methoxy, ethoxy or butoxy and A is an alkyl radical or hydrogen.

* * * * *

UNITED STATES PATENT AND TRADEMARK OFFICE
CERTIFICATE OF CORRECTION

PATENT NO. : 4,353,997

DATED : October 12, 1982

INVENTOR(S) : Michael John Keogh

Page 1 of 2

It is certified that error appears in the above-identified patent and that said Letters Patent is hereby corrected as shown below:

Column 2, line 16; "alkylenealkyl acetate" should read -- alkylene-alkyl acrylate --. Column 5, line 45; "α'-methacryloxypropyltriethoxysilane" should read --γ-methacryloxypropyltriethoxysilane --; Column 5, line 57, "α-methacryloxypropyltrimethoxysilane" should read --γ-methacryloxypropyltrimethoxysilane --. Column 6, line 6;

"α-methacryloxypropyl-tris-(2-methoxyethoxy)silane" should read
-- γ-methacryloxypropyl-tris-(2-methoxyethoxy)silane--; line 10;
" α-aminopropyltrimethoxysilane" should read
-- γ-aminopropyltrimethoxysilane--; line 12;
" α-aminopropyltriethoxysilane" should read
-- γ-aminopropyltriethoxysilane--. Column 11, line 25;
"Zinc coated" should read --Talc coated--.
Claim 2, first line; after "claim 1" insert --or claim 28--
Claim 3, first line; after "claim 1" insert --or claim 28--.
Claim 7, first line; after "claim 1" insert --or claim 28--.
Claim 11, first line; after "claim 1" insert --or claim 28--.
Claim 12, first line; after "claim 1" insert --or claim 28--.
Claim 13, first line; after "claim 1" insert --or claim 28--.
Claim 14, first line; after "claim 1" insert --or claim 28--.
Claim 15, first line; after "claim 1" insert --or claim 28--.
Claim 16, first line; after "claim 1" insert --or claim 28--.
Claim 19, first line; after "claim 1" insert --or claim 28--.

UNITED STATES PATENT AND TRADEMARK OFFICE
CERTIFICATE OF CORRECTION

PATENT NO. : 4,353,997

DATED : October 12, 1982

INVENTOR(S) : Michael John Keogh

It is certified that error appears in the above—identified patent and that said Letters Patent is hereby corrected as shown below:

Claim 20, second line; after "claim 1" insert --or claim 28--.
Claim 21, third line;  after "claim 1" insert --or claim 28--.
Claim 22, first line;  after "claim 1" insert --or claim 28--.
Claim 24, second line; after "claim 1" insert --or claim 28--.
Claim 25, first line;  after "claim 1" insert --or claim 28--.
Claim 26, first line;  after "claim 1" insert --or claim 28--.
Claim 27, first line;  after "claim 1" insert --or claim 28--.

Signed and Sealed this

Fifth Day of July 1983

[SEAL]

Attest:

*Attesting Officer*

GERALD J. MOSSINGHOFF

*Commissioner of Patents and Trademarks*